United States Patent [19]
Gulledge

[11] Patent Number: 4,772,824
[45] Date of Patent: Sep. 20, 1988

[54] DOUBLE THREE-WAY DIMMING SYSTEM

[76] Inventor: Paul L. Gulledge, Route 2, Box 612 J, Fredericksburg, Va. 22405

[21] Appl. No.: 816,875

[22] Filed: Jan. 7, 1986

[51] Int. Cl.⁴ .......................................... H05B 37/02
[52] U.S. Cl. ................... 315/291; 315/362; 315/299; 315/320; 307/112
[58] Field of Search ............... 315/362, 361, 288, 199, 315/291, 299, 321, 320; 307/112, 115

[56] References Cited

U.S. PATENT DOCUMENTS

| | | | |
|---|---|---|---|
| 4,337,418 | 6/1982 | Walz | 315/362 |
| 4,390,814 | 6/1983 | Peck | 315/362 |
| 4,431,948 | 2/1984 | Elder et al. | 315/288 |
| 4,523,132 | 6/1985 | Christansen et al. | 315/362 |
| 4,549,116 | 10/1985 | Andrews | 315/362 |
| 4,591,765 | 5/1986 | Beck | 315/362 |

Primary Examiner—David K. Moore
Assistant Examiner—Michael Razavi
Attorney, Agent, or Firm—James Creighton Wray

[57] ABSTRACT

A double dimming three-way light control system is disclosed wherein light intensity may be controlled from two different locations. Dimming switches have dimming circuitry with on/off capability as well as normally open contacts for operating a latching relay. The latching relay has two momentary contact coils associated with normally open and normally closed contacts which direct current from the two switches to the light fixtures.

15 Claims, 3 Drawing Sheets

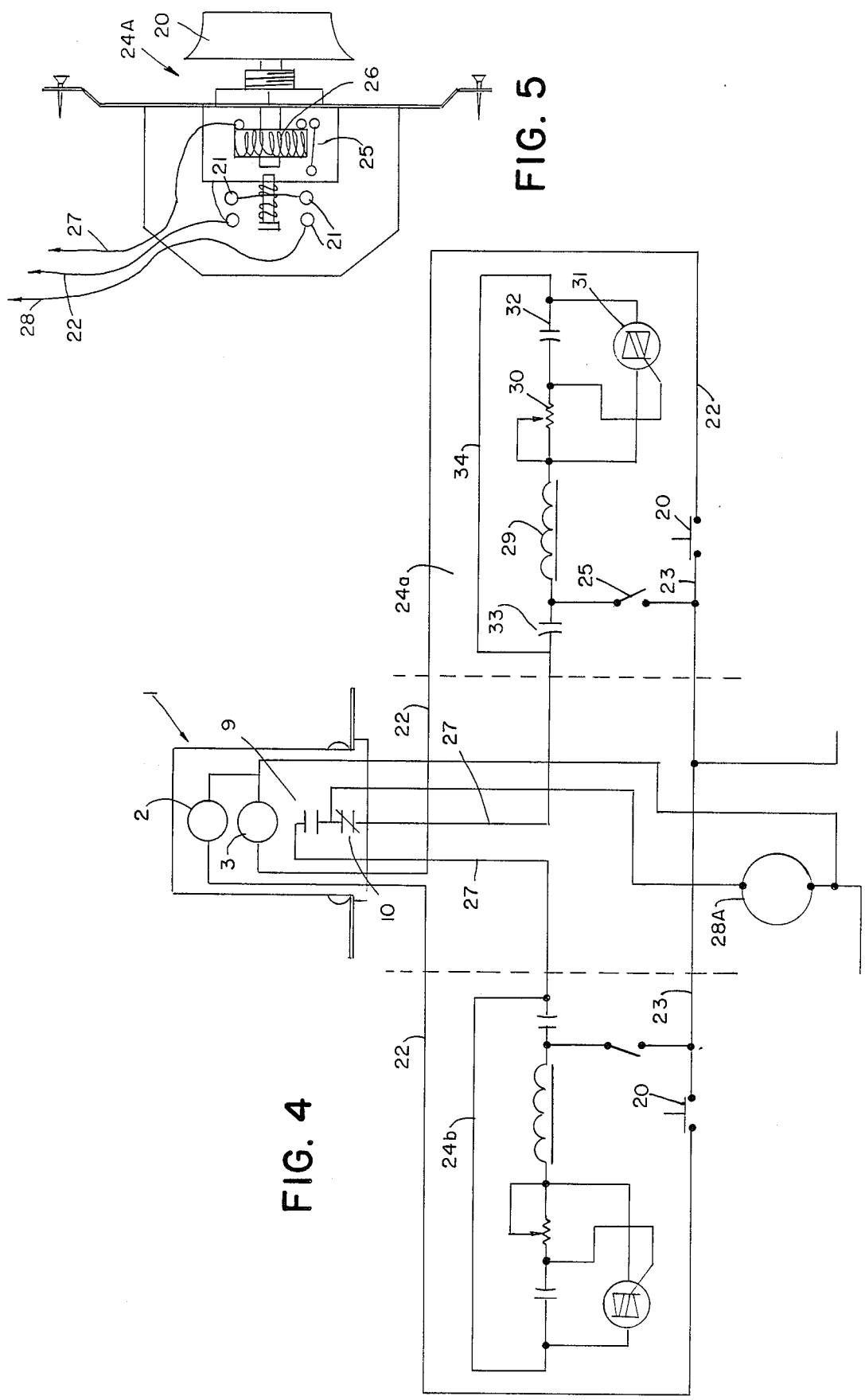

DOUBLE THREE-WAY DIMMING SYSTEM

BACKGROUND OF THE INVENTION

The invention relates to electrical control systems requiring a dimmer or similar control device. More in particular, the invention relates to control systems having a dimmer wherein control may be exerted from two vantage points, each having a dimmer function. More in particular, the invention relates to double three-way dimming systems for controlling incandescent and fluorescent lighting.

Situations arise in residential and business dwellings which require controlling light intensity from two vantage points. In the residential dwellings, it is often desireable to have such lights as chandeliers be capable of varying intensities of light. This is usually taken care of with a very conventional dimming switch. The typical situation is a dining room having two entrances with a light switch at each entrance. The light switches are used to control the chandelier or overhead dining light. The present systems are capable of only having one of the three-way switches being a dimming switch with the other switch being a simple on/off switch. This can be quite inconvenient in that rooms can be fairly large and controlling the brightness from only one spot can be inconvenient. The situation is even more poignant in business situations wherein fluorescent ceiling lights in a large hall or in a theatre may only be controlled from one point. It is true that the on/off function of the ceiling lights can be controlled by more than one point, however, the dimming of the lights can only be controlled from one point.

The invention solves the problems in the prior art by providing a system where lighting may be controlled from two vantage points using dimmer switches which have dimming capability and on/off capabilities.

SUMMARY OF THE INVENTION

The invention is a three-way system for controlling among other things incandescent and fluorescent lights. The system makes possible the control of the intensity of emitted light from two vantage points. An overhead light may thus be controlled from points on opposite sides of the room wherein the light is situated.

The invention is carried out using special three-way dimming switches and a latching relay associated with the light fixture. Ordinary systems which usually comprise an on/off three-way switch with a dimming on/off three-way switch are upgraded by replacing the existing three-way switches with the dimming three-way switches of the invention. A relay is installed in the electrical box of the light fixture or in a relay panel box which directs the light fixture to be controlled by either of the dimming three-way switches.

The fluorescent system is similar but entails a little more circuitry and structure to the system. The dimming switches in the fluorescent system have an extra lead and the latching relay has an extra set of contacts. Wiring cable connecting the switches to the relay and light must have four conductors as opposed to three conductors. The fluorescent lamp which normally has a standard ballast associated with the lamp apparatus should have a standard dimming ballast substituted as well.

To operate the system, one pushes in the knob of the dimming switch which energizes a coil in the latching relay which closes certain contacts and opens others and effects a communication from the dimming switch which is being operated to the light. The knob which is pushed in may then be rotated to control an on/off switch and the related potentiometer. The circuitry comprising the potentiometer is the dimming circuitry and is used to control the flow of electricity and the intensity of the light in a lamp apparatus.

It is an object of this invention to provide a system for dimming lights which may be done from two different vantage points.

It is another object of the invention to provide a simple dimming system for upgrading present systems.

It is another object of this invention to provide a latching relay for use in double dimming three-way switching systems.

These and other and further objects and features of the invention are apparent in the disclosure, which includes the foregoing and following specification and claims and drawings.

BRIEF DESCRIPTION OF THE DRAWINGS

FIG. 4 is a double dimming three-way system for incandescent lights.

FIG. 5 is a plan view of a dimming three-way switch to be used in the incandescent embodiment.

DESCRIPTION OF THE PREFERRED EMBODIMENT

The best mode and preferred embodiment of the invention is as a control system for dimming lights both incandescent and fluorescent. The prototypical context for the invention is a room having two entrances and an overhead light. Adjacent each entrance within the room would be the light controls both of which would turn off and on the overhead light as well as control the brightness of the light. The invention provides the dimming light switches as well as a latching relay.

Existing systems where a light is controlled from two different points is a three-way system where either of the light switches are merely on/off three-way switches or one of the three-way switches has a dimmer and the other is just an on/off system. Both of the three-way switches would have to be removed and replaced by the dimming switches of the invention. Also, the light being controlled by the switches would have to have a latching relay added according to the invention.

The invention is designed to accommodate the controlling of both incandescent and fluorescent lights. For incandescent systems, installation would entail in most cases no modification of existing wiring except the replacement of the three-way switches with the inventive dimming switches and upgrading the light fixture with a latching relay.

Figure 1:
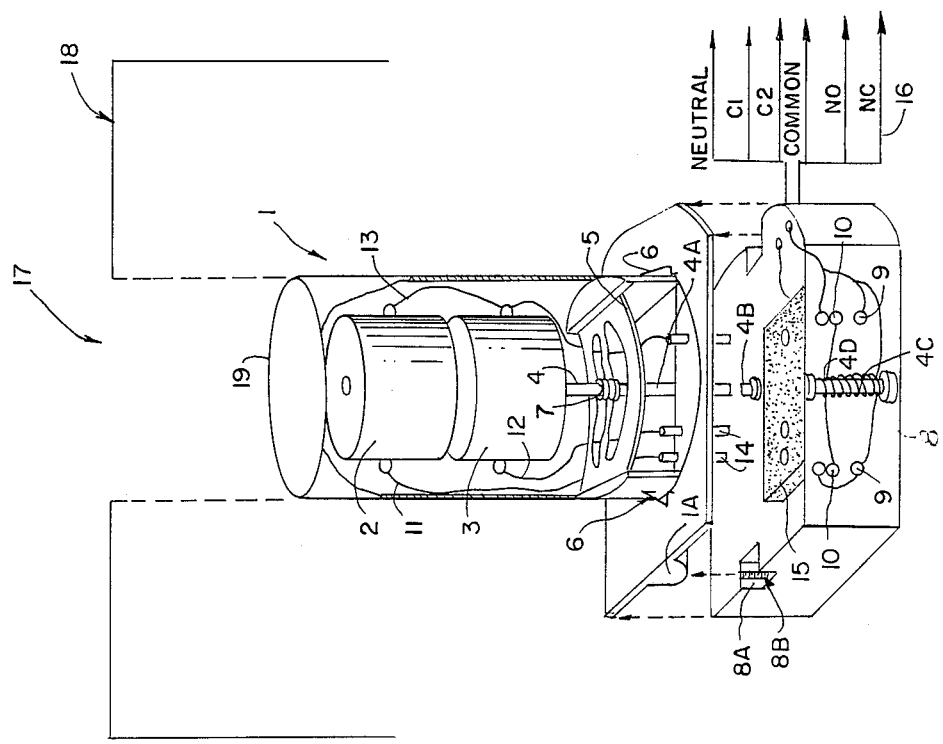
FIG. 1 is an elevated, partially exploded perspective view of a latching relay.

To install the latching relay of FIG. 1, a half-inch knockout is removed from the light fixture electrical box and the latching relay is inserted into the knockout where it is secured by two spring clips and is ready for wiring to the light and the dimming switches.

Referring to FIG. 1, the latching relay is disclosed and is generally indicated by the number 1. This relay has two momentary contact 120 volt alternating current coils, 2, 3. These coils are situated upon a reciprocating rod 4 which in turn is connected to a bimetal strip 5. Rod 4 is connected to the bimetal strip 5 by conventional connector 7 and rod 4 extends beyond the bimetal strip 5 into the contact block 8 where is situated normally open contacts 9 and normally closed contacts 10. It should be noted that there are at least three contact block configurations being single pole double throw, double pole double throw, and three pole double throw. This latching relay 1 has a special use, installation with the incandescent, and fluroescent double three way dimmer lighting systems of the present invention. The latching relay has three contact block configurations, single pole, double throw is used with the incandescent system, and double three way dimmer systems. Double pole double throw is used with fluorescent double three way dimmer systems, and three pole double throw is an extra contact block for electrical devices that would have use for one of the three contact blocks. In the present system, one selects a contact block for latching relay, plugs in the relay to a contact block and screws in two 6/32" screws.

In FIG. 1, when relay is plugged into contact block, contacts 9 will be closed, and contacts 10 will be open. The bimetal strip in this latching relay has two different positions that are controlled by the two 120VAL coil momentary contact coils. The bimetal strip is constructed of spring tempered steel, and is positioned in relay inclosure with pressure forcing the spring steel to bend as shown in FIG. 1. Momentary contact to 120 VAC coil 2 will move rod 4 up, rod 4, connected to bushing 7 will move bimetal strip up, bimetal strip then will be bent in the upward position. Contacts 10 are spring loaded in this position, momentary contact with 120 VAC to coil 3 will move bimetal strip to a downward position, latching contacts 9 in this position.

The rod 4 is connected to leaf spring 5 so that after coil 2 pulls rod 4 upward, leaf spring 5 holds rod 4 upward. When coil 3 pushes rod 4 downward, leaf spring 5 holds rod 4 downward.

As shown in the drawing, armature or rod 4 has two axially aligned parts, primary and secondary armature rods 4A and 4B. Light coil springs 4C and 4D provide the correct amount of contact pressure.

As shown in the drawing, the latching relay 1 and contact block 8 are configured for mounting together. Lugs 1A fit in recesses 8A and screws 8B hold the parts together. When the parts 1 and 8 are assembled, rod 4A pushes rod 4B downward pushing movable contacts 10 downward opening the first set of load contacts and closing the second set of load contacts 9.

The load contacts 9 are constructed are of silver alloy and are gold flashed to provide long life and have a 20 amp rating at 120 volts of alternating current. Coil 2 is connected to one dimmer switch by lead 11, and coil 3 is connected to a different dimming switch by lead 12. Coils 2 and 3 are connected by neutral lead 13. Leads 11, 12 and 13 are connectively received in the contact block by way of an interference fit with connecting means 14 being received in receptacle plate 15. The connection possibilities of receptacle 15 is indicted by the diagrammatic legend 16.

The dimming switches are also connected to the contacts 9 and 10. One dimming switch should be connected to the normally closed contact 10 and the other dimming switch should be connected to the normally open contact 9. To operate the latching relay, 120 volts of alternating current is momentarily supplied to either coil 2 or 3 whereupon reciprocating rod 4 will move up or down which in turn closes normally open contacts 9 or opens normally closed contacts 10.

The concept of the latching relay becomes more clear when viewed in the context of a room having an overhead light with two entrances wherein adjacent each entrance is situated a dimming switch. In order to close a circuit to the light from one of the dimming switches, the switch knob is pushed in momentarily supplying electricity to a coil, for example 3, which would close normally open contacts 9 which in effect creates a circuit of electricity running from the dimming switch to the light. To operate the latching relay from a different point, a dimming switch situated on another side of the room would supply a momentary contact of electricity to coil 2 which would open normally open contacts 9 and close normally closed contacts 10 creating a circuit running from the second dimming switch to the light.

As stated above, the latching relay 1 fits into a one-half inch knockout 17 situated in an electrical box or a relay panel 18.

Installation of the relay is relatively simple in that a contact block for either a single pole double throw or double pole double throw or three pole double throw is selected and the relay is plugged into this block and screwed together with two 6/32 inch screws. The relay is then placed within the knockout and two spring clips on the side of the relay hold the relay in position. The relay is ready to wire.

FIG. 4 discloses the circuit diagram for dimming an incandescent light from two different points. FIG. 5 shows the regulating means or dimmer to be used in the system outlined in FIG. 4.

To operate the system of FIG. 4, the dimming switch of FIG. 5 is used. The operator pushes in button 20 on FIG. 5 momentarily which closes normally open contacts 21, energizing a latching relay coil connected to contacts 21 by lead 22. The contacts themselves receive electricity by way of lead 23. Once the latching relay has been manipulated so that the incandescent light may be controlled from the dimming apparatus 24, the knob 20 may be rotated to control the intensity of the incandescent light. Rotation of the knob 20 controls on/off switch 25 which is connected to, among other things, a potentiometer 26. Thus the electricity flowing to the latching relay and light by 27 is variable.

The incandescent light system is more apparent from FIG. 4. The light fixture 28 is controlled by dimmers 24 by way of latching relay 1. Each dimmer is connected to a momentary contact coil 2, 3 by way of leads 22. The coils 2 and 3 are energized when the push button control 20 is pushed in momentarily to connect hot lead 23 with lead 22. If the dimmer 24a is being used to control light 28, then coil 3 is energized, which keeps contacts 9 open and contacts 10 closed. A circuit is then created from dimmer 24a to light 28 and the light intensity may then be controlled.

The dimming circuitry has on/off switch 25 which receives electricity through lead 23. The on/off switch is connected to inductor 29. The inductor 29 is connected to potentiometer 30 having a rating of 270K ohm. The potentiometer 30 also has two leads connected to triac 31. The potentiometer 30 is also connected to a capacitor 32 having a rating of 250 volts. The capacitor 32 is also connected to triac 31. The on/off switch which is connected to inductor 29 is also connected to capacitor 33, along with inductor 29. Capacitor 32 and capacitor 33 are connected by 34. The dimming circuitry, i.e., 25, 29, 30, 31, 32, 33, 34 are connected by way of lead 27 to contacts 10 and to light 28.

The invention is adapted for use with fluorescent systems and therefore has certain commercial applications as fluorescent lights are used more often in businesses and last up to 30 times as long as incandescent lights. Principle differences between the best mode for the incandescent lighting system and the fluorescent light system are that the dimmer of FIG. 2 has an extra lead and the latching relay of FIG. 1 has two extra sets of contacts as shown in FIG. 3.

Figure 2:
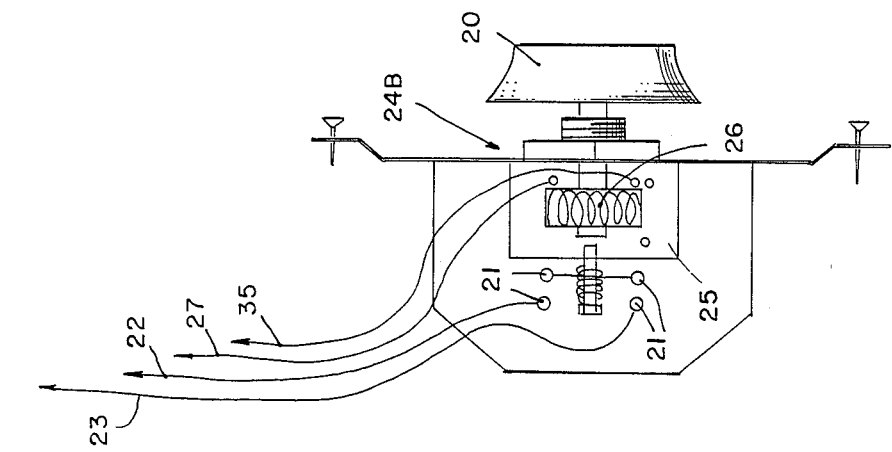
FIG. 2 is a side plan view of a dimming three-way switch for use in fluorescent systems.
Figure 3:
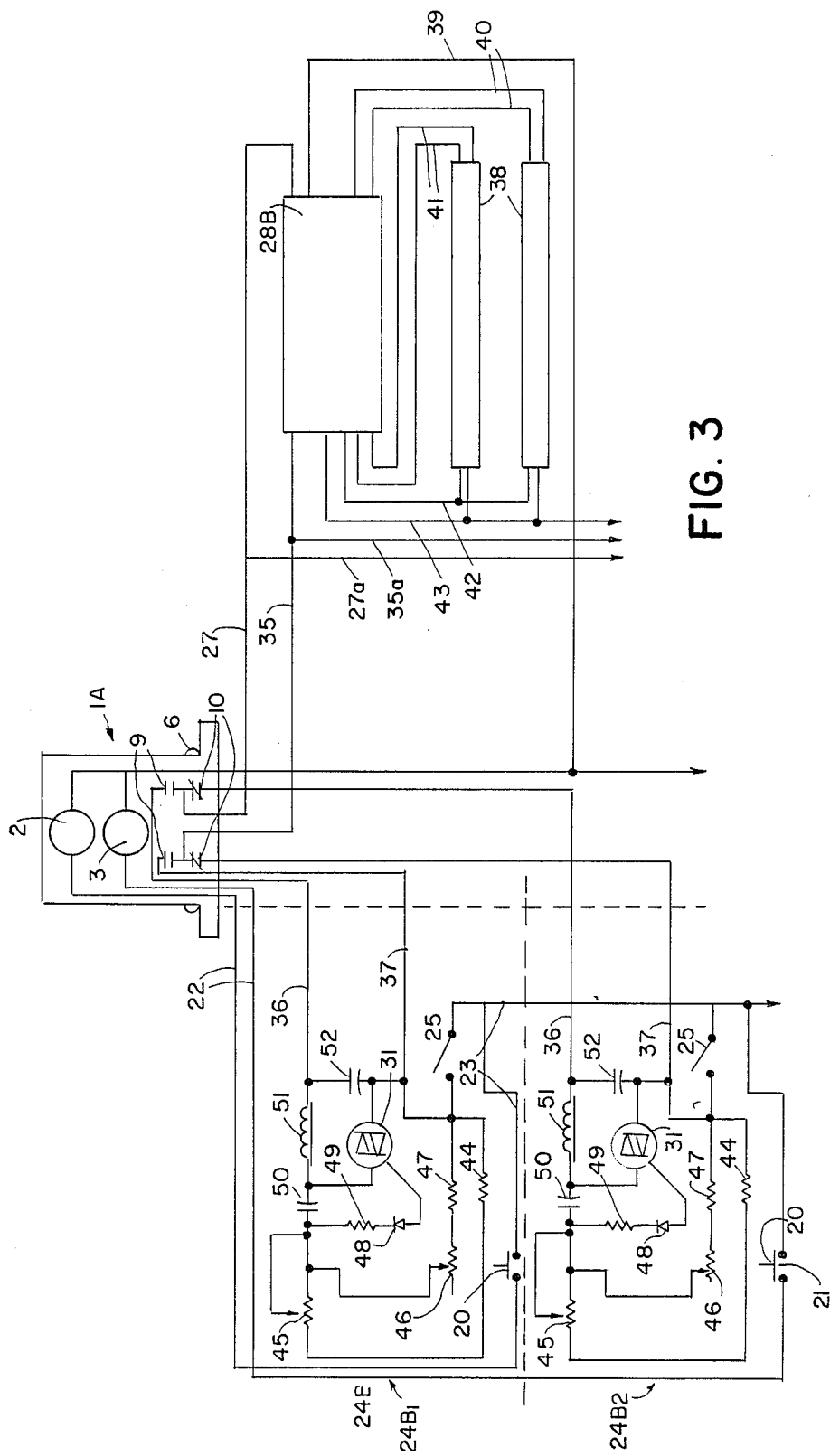
FIG. 3 is schematic representation of a double three-way dimming fluorescent system.

To operate the fluorescent system diagrammatically represented in FIG. 3, one pushes in on knob 20 of FIG. 2 momentarily, thus closing normally open contacts 21 sending electricity to the relay coil by lead 22, thereby forming an electrical circuit to the fluorescent light. Rotating knob 20 opens and closes on/off switch 25 as well as controlling the intensity of the fluorescent light through dimming circuitry 26.

The circuitry for the dimming control of FIG. 2 is shown diagrammatically on FIG. 3 at 24b. At the top of FIG. 3 there is the latching relay for the fluorescent circuit 1a. On the left side of FIG. 3 are the two dimmers 24b. On the right side of FIG. 3 is the fluorescent lamp.

Fluorescent light fixtures typically have a ballast. This is for the purpose of stepping the voltage of 120 volts up to about 600 or 700 volts which is needed to operate the fluorescent light bulbs. It is important the ballast be a standard dimming ballast which is well-known and on the market and which is more substantial than the regular ballast for fluorescent lights. A standard dimming ballast will prevent the light fixture from burning up from the latching relay and dimming circuitry. The term ballast is meant to convey transformers either singular or plural.

The latching relay is connected to the standard dimming ballast by way of leads 27 and 35 which run from the contacts 9 and 10 of latching relay 1a. The ballast is connected to neutral by lead 39. The fluorescent lamps 38 are connected to the standard dimming ballast by way of leads 40 and 41. The fluorescent lamps are also connected to the standard dimming ballast by leads 43 and 42. Extra dimming ballasts may be added to the system by way of leads 43, 27a and 35a.

The dimming circuitry for the fluorescent system is very similar to the incandescent system of FIG. 4. The dimming circuitry 24b has momentary contact push button 20 which when pushed in connects hot lead 23 with leads 22 which energizes one of the coils 2 and 3 and latching relay 1a. Momentarily connecting lead 23 with lead 22 in dimmer 24b1 energizes coil 2 causing normally open contacts 9 to become closed and normally closed contacts 10 to become open thereby creating a circuit from dimmer 24b1 to standard dimming ballast leads 27 and 35. Once this circuit is open, on/off switch 25 and the related circuitry can then be used to regulate the intensity of light emanating from the fluorescent lamps 38.

On/off switch 25 receives electricity by way of lead 23 from a 120 volt alternating current source.

Switch 25 is connected to resistor 44 having a rating of 6.8K ohms. Resistor 44 is then connected to potentiometer or dimmer control pot 45. Potentiometer 45 is connected to another potentiometer 46 having a rating of 1M ohm. Potentiometer 46 is connected to resistor 47 having a 100K ohm rating. Resistor 47 is connected to switch 25.

Switch 25 is also connected to triac 31. Triac 31 is connected to diode 48. Diode 48 is connected to resistor 49 having a 100 ohm rating. Resistor 49 is connected to dimmer control pot 45 and capacitor 50 having a 200 volt rating. Capacitor 50 is connected to triac 31. Capacitor 50 is also connected to inductor 51 having 51 turns. Inductor 51 is connected to lead 36 connecting to normally open contacts 9. Inductor 51 is also connected to capacitor 52 having a 600 volt rating. Capacitor 52 is connected to the on/off switch 25 and triac 31.

To install the double dimming system in a situation where there is at least one incandescent lamp operated by two three-way switches, one needs only to install the latching relay and replace the existing three-way switches with the dimming switch of FIG. 5.

Installation of the double dimming three-way fluorescent system is similar to the incandescent system; however, new wiring will be needed as well as a standard dimming ballast. New wiring is needed to run from the switches to the relay and light because 4 conductors are needed and the typical wiring usually provides only three.

The latching relay is installed in the light fixture or a relay panel. The fluorescent dimming switches of FIG. 2 are installed in place of existing three-way switches. New wire having four conductors is then used to connect the switches to the relays and relays to the light fixture as well as to the standard dimming ballast.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What I claim as my invention is:

1. Apparatus for controlling electrical devices from two different points, comprising:
   (A) Latching relay having first and second coils, each connected to means for positioning contacts, two sets of contacts, a set of contacts associated with each coil, whereby when the first coil is energized the contacts associated with the first coil are closed and the contacts for the second coil are opened and therefore when the second coil is energized the contacts associated with the second coil are closed and the contacts associated with the first coil are opened, said contacts having means for connecting to at least one electrical device;
   (B) First and second dimmer switches wherein the first dimmer switch is connected to the first coil, and the second dimmer switch is connected to a second coil, each of said dimmer switches further comprising an on/off switch and a set of normally open contacts having associated positioning means, wherein each dimmer switch is connected to a power source, whereby positioning means for a dimmer switch closes the normally open contacts, whereby electricity from one set of closed normally open contacts energizes a coil which closes the contacts associated with the coil, said on/off switch further comprising adjusting means for controlling electricity through the relay, the latching relay electrically connected to the first and second dimmer switches, each having first and second coils for imparting reciprocating movement in a rod which moves between and makes contact to complete one of the two sets of contacts, wherein closing the normally open contacts in one of the two dimmer switches energizes the respective coil causing movement of the rod into contact with one of the two sets of contacts, said set contacts completing an electrical circuit between the light fixture and one of the two dimmer switches, wherein each of said dimmer switch associated positioning means operates both the on/off switch and the set of normally open contacts, whereby maneuvering the associated positioning means in one fashion closes the normally open contacts and energizes a coil in the latching relay and maneuvering the associated positioning means in another fashion regulates electricity in the circuit.

2. The device of claim 1 wherein said coils are 120 volt alternating current momentary contact coils.

3. The device of claim 2 where said latching relay further comprises spring biasing means connecting said coils to said contacts, whereby said latching relay has a set of normally open contacts and a set of normally closed contacts.

4. The device of claim 3 where said spring biasing means further comprises a bimetal strip held in place by spring clips which changes position in response to coils being energized whereby normally open contacts may become normally closed contacts and vice versa.

5. The device of claim 4 wherein said coils are mounted in tandem on a shaft which is connected to the spring biased bi-metal strip and said normally open and normally closed contacts.

6. The device of claim 4 where said latching relay further consists of a selected one of three contact block configurations wherein a first configuration is single pole double throw, a second configuration is double pole double throw, and a third configuration is three pole double throw.

7. The device of claim 1 wherein said associated positioning means is a spring loaded rod with a knob on one end, whereby movement of the rod in an axial direction closes normally open contacts associated with the dimmer switch and rotation of the rod controls the on/off switch as well as the amount of electricity supplied into the circuit.

8. The device of claim 7 where said dimmer switch is adapted for use in dimming fluorescent lamps, further comprising four leads, wherein a first lead is connected to a 120 volt alternating current source, a second lead is connected to a latching relay first coil, and third and fourth leads are connected to normally open contacts in said latching relay, whereby the first lead supplies electricity to the circuit, the second lead controls the energization of the first latching relay coil and the third and fourth leads which are connected to the normally open contacts are connected to the fluorescent lamp once electricity energizes the first coil closing the normally open contacts connecting the third and fourth leads to wires running to the fluorescent lamp.

9. The device of claim 8 wherein said first lead is connected to the on/off switch and normally open contacts.

10. The device of claim 9 further comprising dimming circuitry in the dimmer switch further comprising the on/off switch being connected to a resistor having a value of 6.8K ohms which in turn is connected to a second resistor having a value of 310K ohms, said second resistor being the dimmer control pot and therefore a potentiometer, said on/off switch also being connected to a third resistor having a value of 100K ohms which in turn is connected to a fourth resistor having a value of 1M ohm wherein said fourth resistor is a potentiometer for a trim circuit, said fourth resistor being connected to a lead running from said second resistor, said lead running from said second resistor further connected to a fifth resistor having a value of 100K ohms, which in turn is connected to a diode which in turn is connected to one of three leads on a triac, said lead running from said second resistor also being connected to a first capacitor having a 200 volt rating, said first capacitor being connected to a second lead of said triac and said first capacitor also being connected to an inductor and said inductor being connected to said third lead connecting to a normally open contact, said inductor also being connected to a second capacitor having a rating of 600 volts and said capacitor being connected to a third lead of said triac, said second capacitor also being connected to said on/off switch and said second capacitor also connected to said fourth lead connecting to the normally open contacts.

11. The device of claim 10 further comprising a standard dimming ballast for fluorescent lamps having two leads connecting to the contact block of the latching relay.

12. The device of claim 7 wherein said dimmer switch is adapted to control the electricity to an incandescent lamp, said regulating means further comprising three leads wherein a first lead is connected to a 120 volt alternating current source, a second lead is connected to a first coil of a latching relay, and a third lead is connected to a normally open contact of said latching relay.

13. The device of claim 12 wherein said first lead is connected to the normally open contacts of said dimmer switch and said on/off switch of said regulating means.

14. The device of claim 13 further comprising dimming circuitry in the dimmer switch, said dimming circuitry further comprising a first resistor having a 6.8 K ohm rating being connected to said on/off switch, said first resistor being connected to a first potentiometer, whereby said first potentiometer is a dimmer control pot, said dimmer control pot having a rating of 310K ohm, said first potentiometer being connected to a second potentiometer having a 1M ohm rating, said second potentiometer being connected to a second resistor having a 100K ohm rating and said second resistor being connected to said on/off switch, said dimmer control pot being connected to a third resistor having a 100K ohm rating, said third resistor being connected to a diode, said diode being connected to a triac, said dimmer control pot and third resistor being connected to a first capacitor having a 200 volt rating, said first capacitor being connected to said triac, said first capacitor and triac being connected to a inductor having 51 turns, said inductor being connected to a second capacitor having a 600 volt rating, said second capacitor being connected to said triac.

15. The device of claim 14 wherein said dimming circuitry has a lead running from the inductor to a normally open contact of the latching relay and said dimming circuitry has a lead connecting the second capacitor, the triac and the on/off switch to another normally open contact in the latching relay, whereby closing of the normally open contacts of the latching relay connects said dimming circuitry with a standard dimming ballast.

* * * * *